US012683503B2

(12) United States Patent
Imamura

(10) Patent No.: US 12,683,503 B2
(45) Date of Patent: Jul. 14, 2026

(54) BOOST CONVERTER

(71) Applicant: ROHM CO., LTD., Kyoto (JP)

(72) Inventor: Asuma Imamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 26 days.

(21) Appl. No.: 18/794,026

(22) Filed: Aug. 5, 2024

(65) Prior Publication Data

US 2024/0396455 A1 Nov. 28, 2024

Related U.S. Application Data

(63) Continuation of application No. PCT/JP2023/003277, filed on Feb. 1, 2023.

(30) Foreign Application Priority Data

Feb. 14, 2022 (JP) ................................. 2022-020427

(51) Int. Cl.
| | |
|---|---|
| *H05B 45/36* | (2020.01) |
| *H02M 1/44* | (2007.01) |
| *H02M 3/158* | (2006.01) |
| *H05B 45/38* | (2020.01) |

(52) U.S. Cl.
CPC .......... *H02M 3/1588* (2013.01); *H02M 1/44* (2013.01); *H05B 45/36* (2020.01); *H05B 45/38* (2020.01)

(58) Field of Classification Search
CPC ........ H05B 45/36; H05B 45/37; H05B 45/38; H05B 45/3725; H02M 1/44; H02M 3/155; H02M 3/1588
See application file for complete search history.

(56) References Cited

U.S. PATENT DOCUMENTS

| | | | | |
|---|---|---|---|---|
| 6,101,108 A | * | 8/2000 | Wittenbreder, Jr. | ........................ H02M 1/4225 323/239 |
| 6,275,018 B1 | * | 8/2001 | Telefus | ................. H02M 3/156 363/16 |
| 7,102,339 B1 | * | 9/2006 | Ferguson | .............. H02M 3/157 323/284 |

(Continued)

FOREIGN PATENT DOCUMENTS

| | | |
|---|---|---|
| JP | 2001015332 A | 1/2001 |
| JP | 2009077523 A | 4/2009 |
| JP | 2020057714 A | 4/2020 |

OTHER PUBLICATIONS

International Search Report for International Application No. PCT/JP2023/003277; mailed Mar. 20, 2023.

(Continued)

*Primary Examiner* — Tung X Le

(74) *Attorney, Agent, or Firm* — CANTOR COLBURN LLP

(57) ABSTRACT

An inductor is coupled at one end to an input line. A switching transistor and a shunt resistor are coupled in series between the other end of the inductor and a ground line. A rectifier diode is coupled between the other end of the inductor and an output line. A converter controller controls the switching transistor according to at least a voltage drop across the shunt resistor. A first output capacitor has one end coupled to the output line, and the other end coupled to a connection node that couples the switching transistor and the shunt resistor.

7 Claims, 10 Drawing Sheets

(56) References Cited

U.S. PATENT DOCUMENTS

| | | | | |
|---|---|---|---|---|
| 7,626,370 B1 * | 12/2009 | Mei | .................... | H02M 3/1563 |
| | | | | 323/222 |
| 8,779,737 B2 * | 7/2014 | Tseng | ...................... | H03K 7/08 |
| | | | | 323/282 |
| 2006/0261754 A1 * | 11/2006 | Lee | ....................... | H05B 45/10 |
| | | | | 315/291 |

OTHER PUBLICATIONS

PCT International Preliminary Report on Patentability with Written Opinion of the International Search Authority for International Application No. PCT/JP2023/003277; mailed Mar. 20, 2023.

* cited by examiner

COMPARISON TECHNIQUE

EMBODIMENT

BOOST CONVERTER

CROSS REFERENCE TO RELATED APPLICATIONS

This application is a continuation under 35 U.S.C. § 120 of PCT/JP2023/003277, filed Feb. 1, 2023, year, which is incorporated herein by reference, and which claimed priority to Japanese Application No. 2022-020427, filed Feb. 14, 2022. The present application likewise claims priority under 35 U.S.C. § 119 to Japanese Application No. 2022-020427, filed Feb. 14, 2022, the entire content of which is also incorporated herein by reference.

BACKGROUND

1. Technical Field

The present disclosure relates to a boost converter.

2. Related Art

In various kinds of electronic devices, vehicles, and industrial equipment, a DC/DC converter is employed so as to convert a DC voltage having a given voltage value to a DC voltage having another voltage value.

Electronic devices are required to have an Electro-Magnetic Compatibility (EMC) characteristic, i.e., a non-interference characteristic that ensures that the electronic device itself has no adverse electromagnetic effect on another device and electromagnetic resistance that ensures that the electronic device itself is not adversely electromagnetically affected by another device. The former characteristic is evaluated as Electro-Magnetic Interference (EMI). The latter characteristic is evaluated as Electro-Magnetic Susceptibility (EMS).

The switching frequency of a DC/DC converter is on the order of several hundred kHz to several MHz. However, the switching voltage has a waveform that is similar to a square wave. This leads to the occurrence of harmonic noise with a frequency that is higher than the switching frequency. Accordingly, it is difficult for conventional circuit board designing methods to meet a specification (e.g., CISPR 25 or the like developed by the International Special Committee on Radio Interference (CISPR)) required for in-vehicle components.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
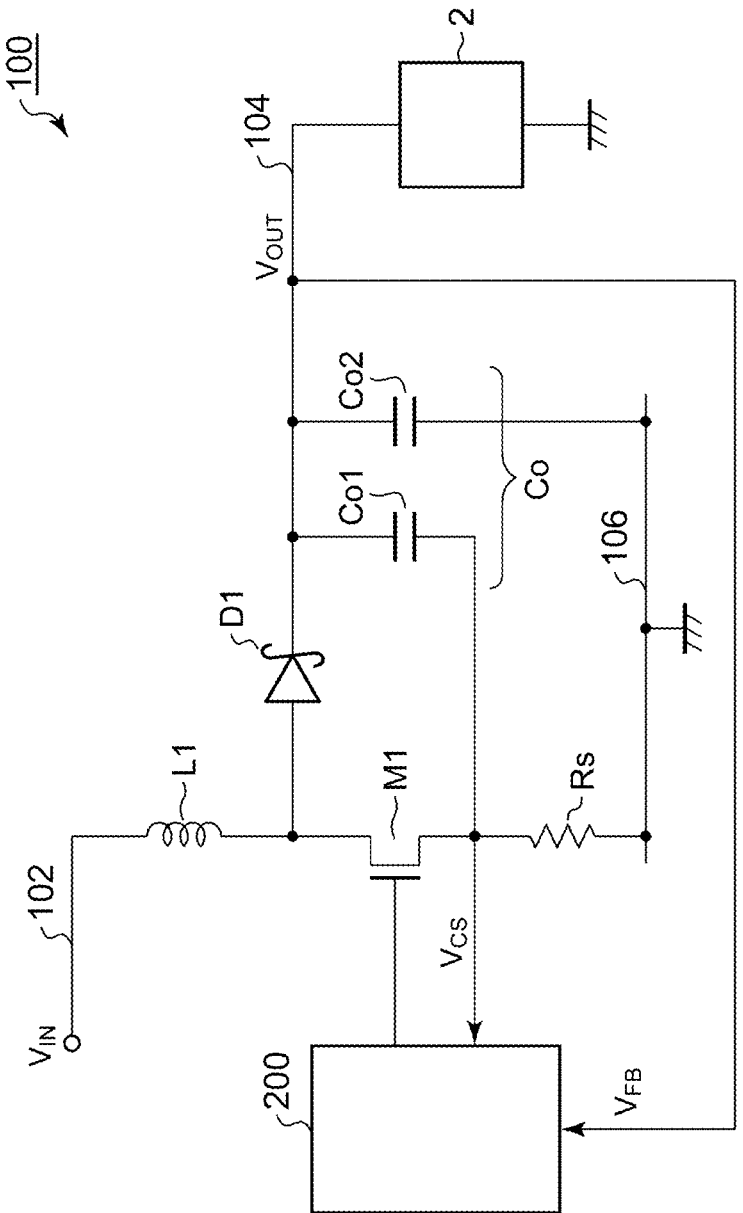
FIG. 1 is an equivalent circuit diagram of a boost converter according to an embodiment.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. Furthermore, the outline described below is by no means a comprehensive outline of all possible embodiments. That is to say, the outline is by no means intended to identify the indispensable or essential elements of all the embodiments and is by no means intended to define the scope of a part of or all the embodiments. For convenience, in some cases, an "embodiment" as used in the present specification represents a single or multiple embodiments (examples and modifications) disclosed in the present specification.

A boost converter according to one embodiment includes: an input line structured to receive an input voltage; an output line to be coupled to a load; an inductor having one end coupled to the input line; a switching transistor and a shunt resistor coupled in series between the other end of the inductor and a ground line; a rectifier element coupled between the other end of the inductor and the output line; a converter controller structured to control the switching transistor according to at least a voltage drop across the shunt resistor; and a first output capacitor having one end coupled to the output line and the other end coupled to a connection node that couples the switching transistor and the shunt resistor.

In a boost converter topology, an AC current loop is formed of a switching transistor, a rectifier element, an output capacitor, and a ground line. The performance with respect to electromagnetic noise such as EMC tends to degrade as the number of components of the AC current loop becomes larger, i.e., as the area of the AC current loop becomes larger. With this configuration described above in which the shunt resistor is bypassed by the first output capacitor, this allows the number of components of the AC current loop to be reduced and allows the area of the AC current loop to be reduced, thereby improving the characteristics with respect to electromagnetic noise.

In one embodiment, the boost converter may further include a second output capacitor with one end coupled to the output line and the other end coupled to the ground line. With such an arrangement in which the second output capacitor and the first output capacitor are provided separately, this is capable of smoothing the output voltage without hindering current detection by the shunt resistor.

In one embodiment, the first output capacitor may have a capacitance that is smaller than that of the second output capacitor. With such an arrangement in which the second output capacitor is designed to have a larger capacitance, this is capable of smoothing the output voltage. Also, with such an arrangement in which the first output capacitor is designed to have a smaller capacitance, this is capable of eliminating the effects on the current detection by the shunt resistor.

In one embodiment, the first output capacitor may have a capacitance that is smaller than $\frac{1}{10}$ of that of the second output capacitor.

In one embodiment, the switching transistor may have a switching frequency of 100 kHz to 2 MHz. Also, the first output capacitor may have a capacitance of 100 pF to 0.1 µF.

In one embodiment, the switching transistor, the shunt resistor, the rectifier element, the first output capacitor, and the second output capacitor may be mounted on a printed circuit board. A closed loop formed of the switching transistor, the rectifier element, and the first output capacitor on the printed circuit board may have the area that is smaller than the area of a closed loop formed of the switching transistor, the rectifier element, the shunt resistor, and the second output capacitor.

In one embodiment, the rectifier element may be configured as a diode.

In one embodiment, the rectifier element may be configured as a synchronous rectification transistor.

In one embodiment, the load may include multiple light-emitting elements coupled in series.

EMBODIMENTS

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure and the present invention. Also, it is not necessarily essential for the present disclosure and the present invention that all the features or a combination thereof be provided as described in the embodiments.

In the present specification, a state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

FIG. 1 is an equivalent circuit diagram of a boost converter 100 according to an embodiment. The boost converter 100 boosts an input voltage $V_{IN}$ and supplies an output voltage VOUT after boosting to a load circuit 2.

The boost converter 100 includes an input line 102, an output line 104, an inductor L1, a switching transistor (low-side transistor) M1, a rectifier diode D1, a shunt resistor Rs, a converter controller 200, and an output capacitor group Co.

The DC input voltage $V_{IN}$ is supplied to the input line 102 from an unshown power supply. A load circuit 2 is coupled to the output line 104.

One end of the inductor L1 is coupled to the input line 102. The switching transistor M1 and the shunt resistor Rs are coupled in series between the other end of the inductor L1 and a ground line 106. The anode of the rectifier diode D1 is coupled to a connection node that couples the inductor L1 and the switching transistor M1. The cathode of the rectifier diode D1 is coupled to the output line 104.

The output capacitor group Co includes a first output capacitor Co1 and a second output capacitor Co2. The first output capacitor Co1 is coupled between the output line 104 and a connection node that couples the switching transistor M1 and the shunt resistor Rs. The second output capacitor Co2 is coupled between the output line 104 and the ground line 106.

During the on period of the switching transistor M1, a current (coil current) that flows through the inductor L1 and the switching transistor M1 flows through the shunt resistor Rs. A voltage drop Vs that is proportional to the coil current occurs across both ends of the shunt resistor Rs. The converter controller 200 receives the voltage drop Vs of the shunt resistor Rs as a current detection signal. The converter controller 200 drives the switching transistor M1 based on at least the current detection signal Vs.

In the present embodiment, a feedback signal $V_{FB}$ that indicates the electrical state of the load circuit 2 is input to the converter controller 200. The converter controller 200 feedback-controls the duty cycle of the switching transistor M1 such that the feedback signal $V_{FB}$ approaches a target value.

The configuration and the control method of the converter controller 200 are not restricted in particular. For example, the converter controller 200 may be configured as a peak-current-mode controller. In this case, the converter controller 200 amplifies the difference between the feedback signal $V_{FB}$ and the target value $V_{REF}$ thereof so as to generate a peak current instruction value that stipulates the peak of the coil current. With this, the duty cycle of the switching transistor M1 may be feedback-controlled such that the peak of the current detection signal Vs approaches the peak current instruction value.

Also, the converter controller 200 may be configured as an average-current-mode controller. In this case, the converter controller 200 may amplify the difference between the feedback signal $V_{FB}$ and its target value $V_{REF}$ so as to generate an average current instruction value that stipulates the average value of the coil current. With this, the duty cycle of the switching transistor M1 may be feedback-controlled such that the average value of the current detection signal Vs approaches the average current instruction value.

Also, the converter controller 200 may be configured as a voltage-mode controller. In this case, the converter controller 200 may amplify the difference between the feedback signal $V_{FB}$ and its target value $V_{REF}$ so as to generate an average current instruction value that stipulates the average value of the coil current. Also, the converter controller 200 may feedback-control the duty cycle of the switching transistor M1 such that the average value of the current detection signal Vs approaches the average current instruction value.

The current detection signal Vs is not used for the feedback control but is used for overcurrent protection.

The above is the configuration of the boost converter 100. The advantages of the boost converter 100 can be clearly understood in comparison with conventional techniques. Accordingly, description will be made regarding a boost converter 100 according to a conventional technique.

Figure 2:
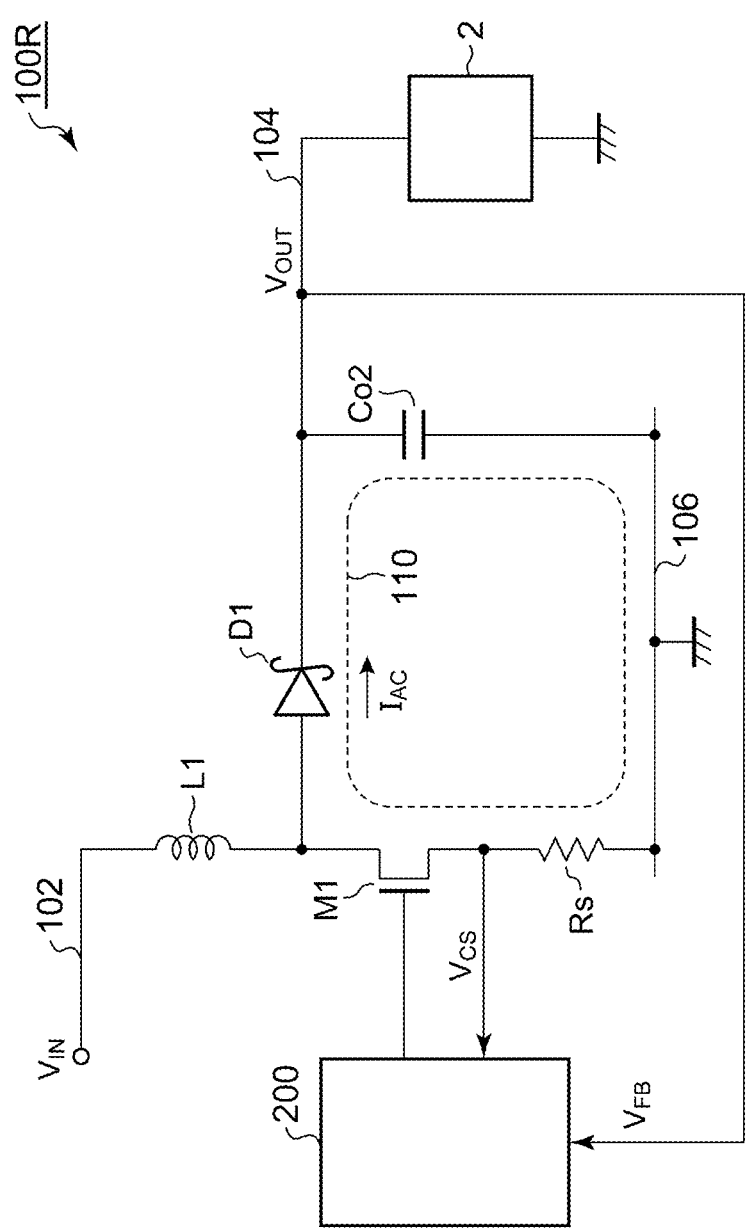
FIG. 2 is an equivalent circuit diagram of a boost converter according to a comparison technique.

FIG. 2 is an equivalent circuit diagram of a boost converter 100R according to a comparison technique. The boost converter 100R, according to the comparison technique has the same configuration as the boost converter 100 shown in FIG. 1 except that the boost converter 100R does not include the first output capacitor Co1 shown in FIG. 1. The other configuration of the boost converter 100R is the same as that shown in FIG. 1.

Description will be made regarding problems that occur in the boost converter 100R according to the comparison technique. The switching transistor M1, the rectifier diode D1, the second output capacitor Co2, and the shunt resistor Rs form an AC current loop 110. When the boost converter 100R operates by switching, an AC current $I_{AC}$ flows through the AC current loop 110. In addition to the switching frequency of the boost converter 100R, the AC current $I_{AC}$ includes high-frequency components thereof. The AC current loop 110 functions as a kind of antenna and radiates electromagnetic noise induced by the AC current $I_{AC}$.

With this arrangement, as the number of components of the AC current loop becomes large, i.e., as the area of the AC current loop becomes large, the intensity or the amount of the electromagnetic noise radiated from the antenna tends to increase.

Figure 3:
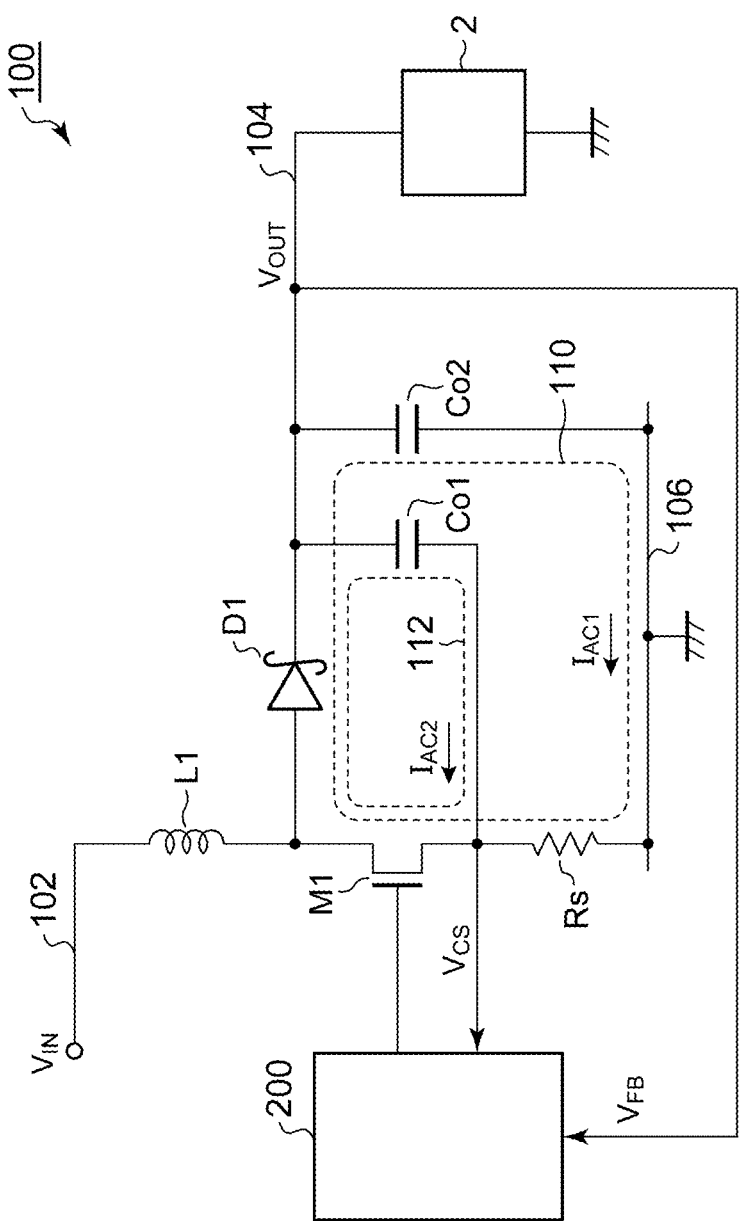
FIG. 3 is a diagram for explaining an advantage of the boost converter according to the embodiment.

FIG. 3 is a diagram for explaining an advantage of the boost converter 100 according to an embodiment. As with the comparison technique, in the boost converter 100, the switching transistor M1, the rectifier diode D1, the second output capacitor Co2, and the shunt resistor Rs form a first AC current loop 110. Furthermore, in the boost converter 100, the switching transistor M1, the rectifier diode D1, and the first output capacitor Co1 form a second AC current loop 112.

The first AC current loop 110 includes a sense resistor Rs. On the other hand, the second AC loop 112 does not include a sense resistor Rs. Accordingly, current components having relatively low frequencies flow through the first AC current loop 110, and current components having relatively high frequencies flow through the second AC current loop 112. The relatively low frequencies include the switching frequency of the boost converter 100. Accordingly, the current component having the switching frequency flows through the shunt resistor Rs. Accordingly, the second AC current loop 112 has no effect on current detection by the shunt resistor Rs.

On the other hand, the high-frequency current that involves an EMI problem or the like flows through the second AC current loop 112. The second AC current loop 112 is formed inside the first AC current loop 110. With this, the shunt resistor Rs and the ground line 106 are bypassed by the first output capacitor Co1. Accordingly, the number of the components of the second AC current loop 112 is smaller than that of the components of the first AC current loop 110. In other words, this allows the second AC current loop 112 to have an area that is smaller than that of the first AC current loop 110. That is to say, in a case in which the second AC current loop 112 and the first AC current loop 110 are each viewed as a radiating antenna that radiates high-frequency noise, the antenna of the second AC current loop 112 has performance that is lower than that of the antenna of the first AC current loop 110. Accordingly, with such a configuration shown in FIGS. 1 and 3 in which a high-frequency current flows through the second AC current loop 112, this allows electromagnetic noise to be reduced as compared with the comparison technique in which such a high-frequency current flows through the first AC current loop 110.

Figure 4:
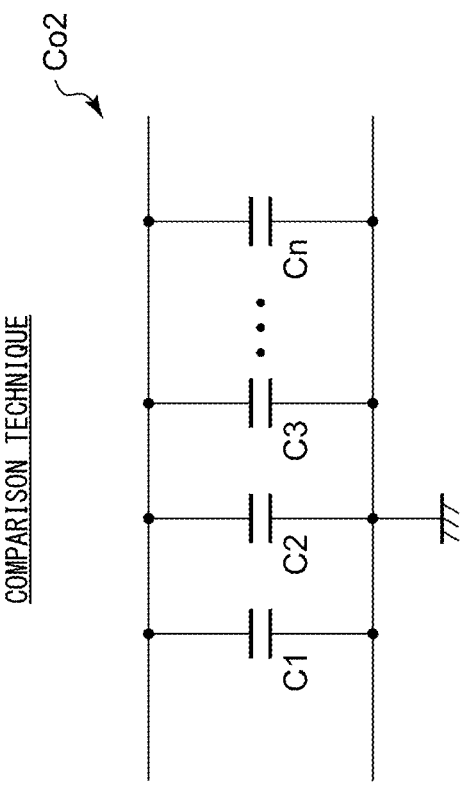
FIG. 4 is a diagram for explaining a second output capacitor according to the comparison technique.

FIG. 4 is a diagram for explaining the second output capacitor Co2 according to the comparison technique. Description will be made with reference to FIG. 2 regarding a boost converter 100R according to the comparison technique assuming that the second output capacitor Co2 includes a plurality of n capacitors C1 through Cn coupled in parallel. The n capacitors C1 through Cn may have different capacitance values.

Figure 5:
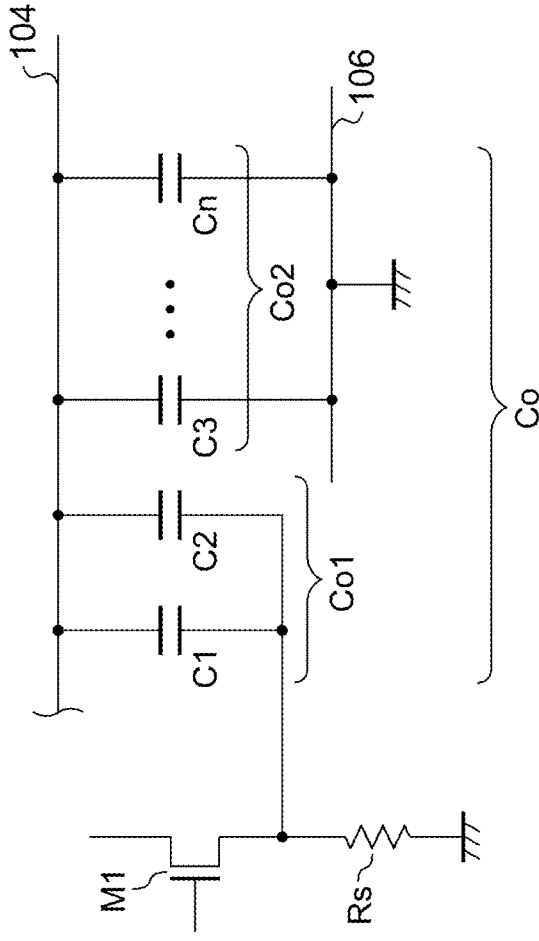
FIG. 5 is a diagram for explaining an output capacitor group of the boost converter according to the embodiment.

FIG. 5 is a diagram for explaining an output capacitor group of the boost converter 100 according to an embodiment. The output capacitor group Co includes the same number n of capacitors C1 through Cn as that of the comparison technique. From among the n capacitors, k (k<n) capacitors are assigned to the first output capacitor Co1, and (n–k) capacitors are assigned to the second output capacitor Co2.

The n capacitors C1 through Cn may have different capacitance values. For example, description will be made regarding an arrangement in which n=4 assuming that the capacitors C1 and C2 each have a relatively small capacitance value, and the capacitors C3 and C4 each have a relatively large capacitance value. In this case, the capacitors C1 and C2 having such a small capacitance value are assigned to the first output capacitor Co1 and are coupled to the shunt resistor Rs. In contrast, the capacitors C3 and C4 having a large capacitance value are assigned to the second output capacitor Co2 and are coupled to the ground line 106.

For example, the capacitors C1 and C2 to be assigned as the first output capacitor Co1 may each have a capacitance that is smaller than $1/10$ of the capacitance of each of the capacitors C3 through Cn to be assigned as the second output capacitor Co2.

For example, the switching transistor M1 has a switching frequency of 100 kHz to 2 MHz. In this case, the capacitors C1 and C2 that form the first output capacitor Co1 are each preferably designed to have a capacitance of 100 pF to 0.1 μF.

With such a configuration shown in FIG. 5, in the embodiment, the number of the capacitors that form the output capacitor group Co is the same as that in the comparison technique. Accordingly, this allows an increase in the number of chips to be suppressed, thereby suppressing an increase in the circuit mounting area.

Figure 6:
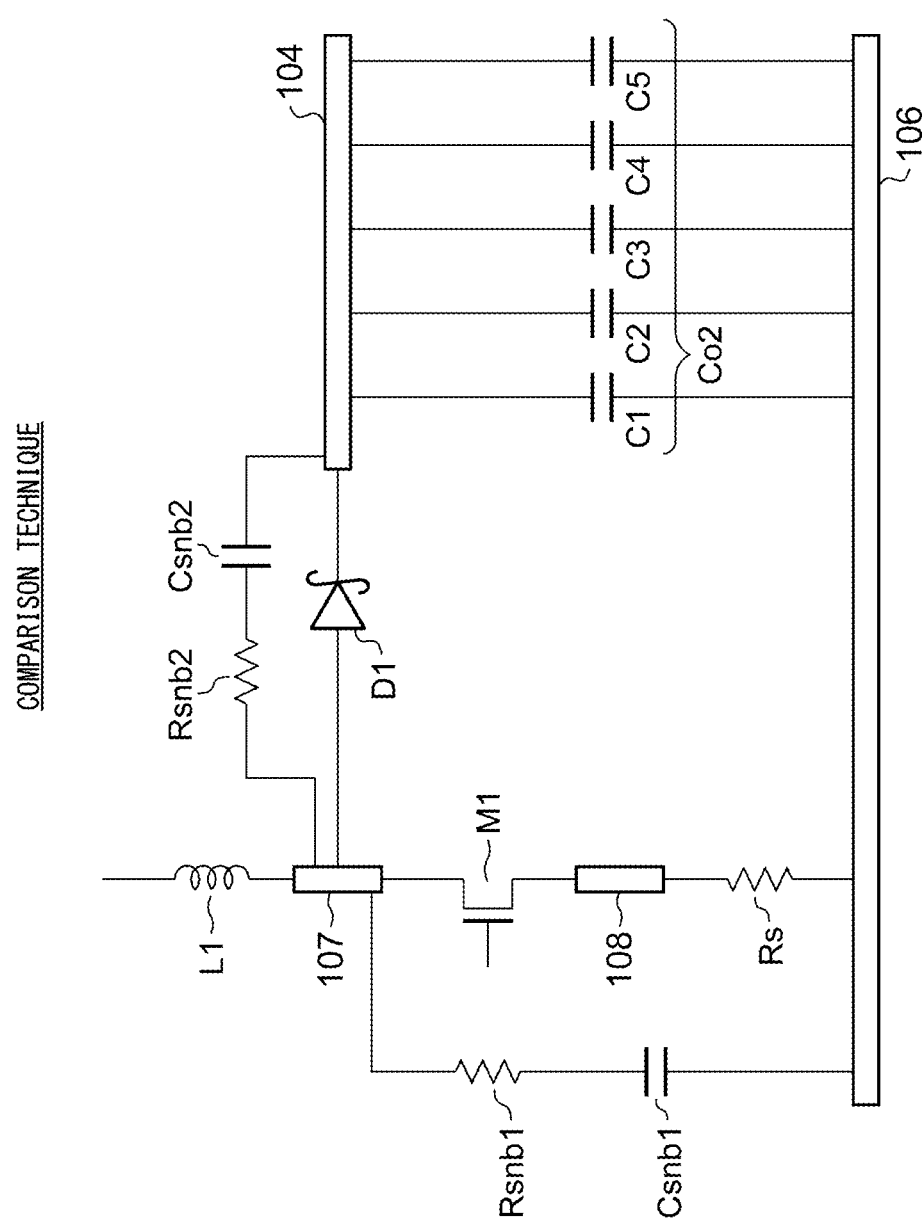
FIG. 6 is an equivalent circuit diagram of a main circuit portion of the boost converter according to the comparison technique.

FIG. 6 is an equivalent circuit diagram of a main circuit portion of the boost converter 100R according to the comparison technique. The boost converter 100R includes a series circuit of a snubber resistor Rsnb1 and a snubber capacitor Csnb1 coupled in parallel with a series circuit of the switching transistor M1 and the shunt resistor Rs. Furthermore, the boost converter 100R includes a series circuit of a snubber resistor Rsnb2 and a snubber capacitor Csnb2 coupled in parallel with the rectifier diode D1. The output capacitor Co2 includes five capacitors C1 through C5. Wiring 107 couples the drain of the transistor M1 and the inductor L1. Wiring 108 couples the source of the transistor M1 and the shunt resistor Rs.

Figure 7:
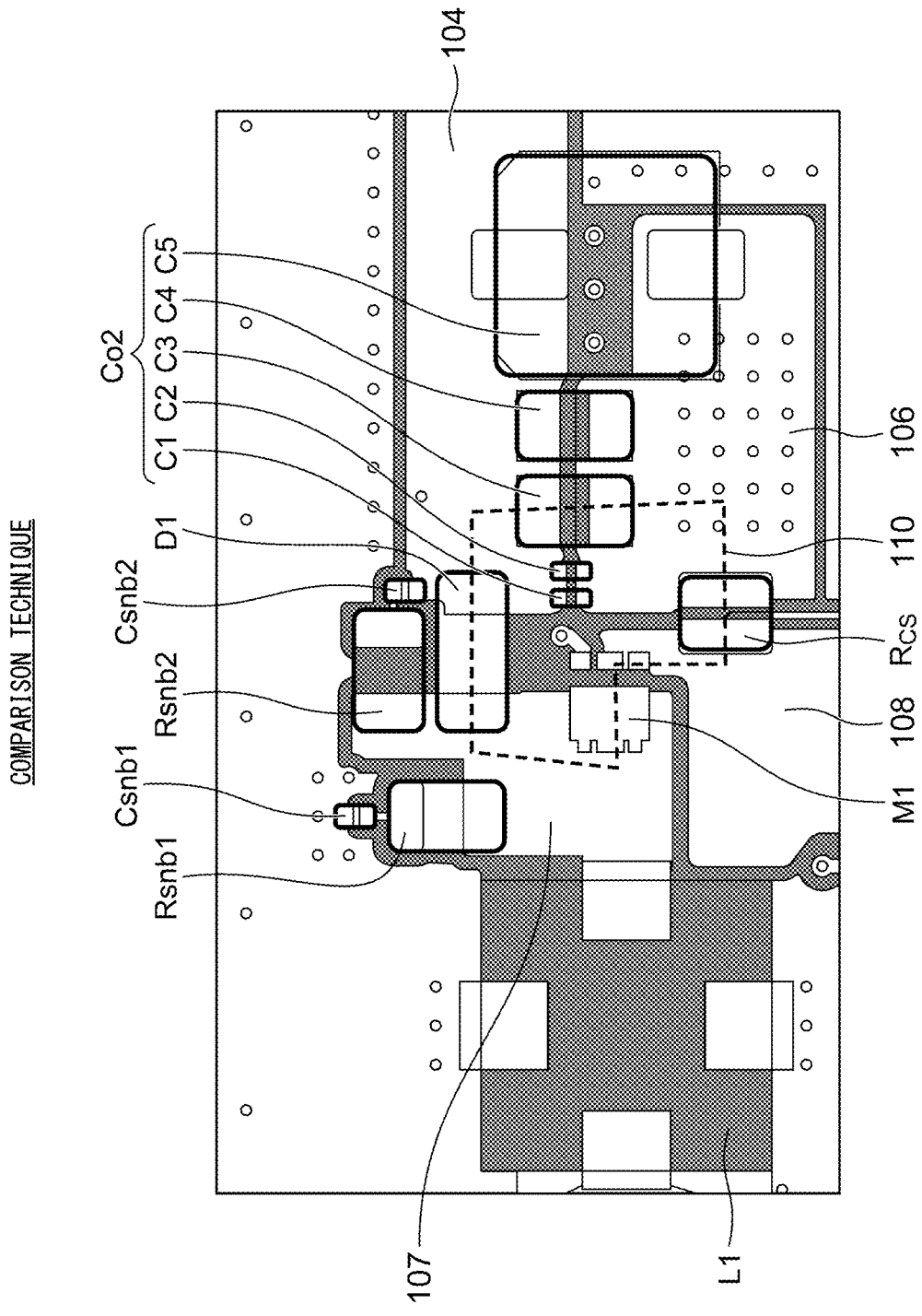
FIG. 7 is a diagram showing an example of the layout of a printed circuit board of the boost converter shown in FIG. 6.

FIG. 7 is a diagram showing an example of a layout of a printed circuit board of the boost converter 100R shown in FIG. 6. In this layout, an AC current loop 110 is formed including the wiring 107, the switching transistor M1, the rectifier diode D1, the output line 104, the second output capacitor Co2, the ground line 106, the shunt resistor Rs, and the wiring 108.

Figure 8:
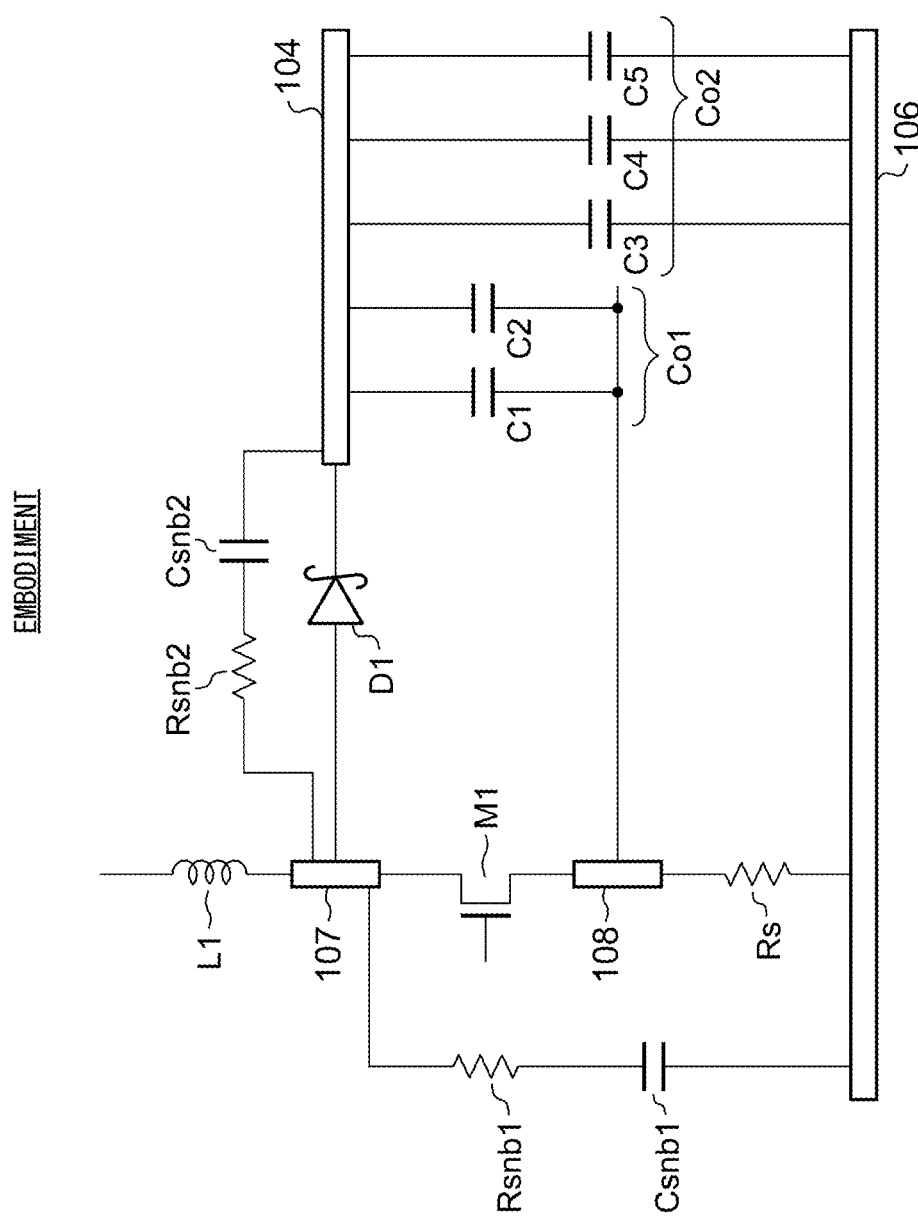
FIG. 8 is an equivalent circuit diagram of a main circuit portion of the boost converter according to the embodiment.

FIG. 8 is an equivalent circuit diagram of a main circuit portion of the boost converter 100 according to the embodiment. The capacitors C1 and C2 are configured as the first output capacitor Co1. One end of the first output capacitor Co1 is coupled to the wiring 108.

Figure 9:
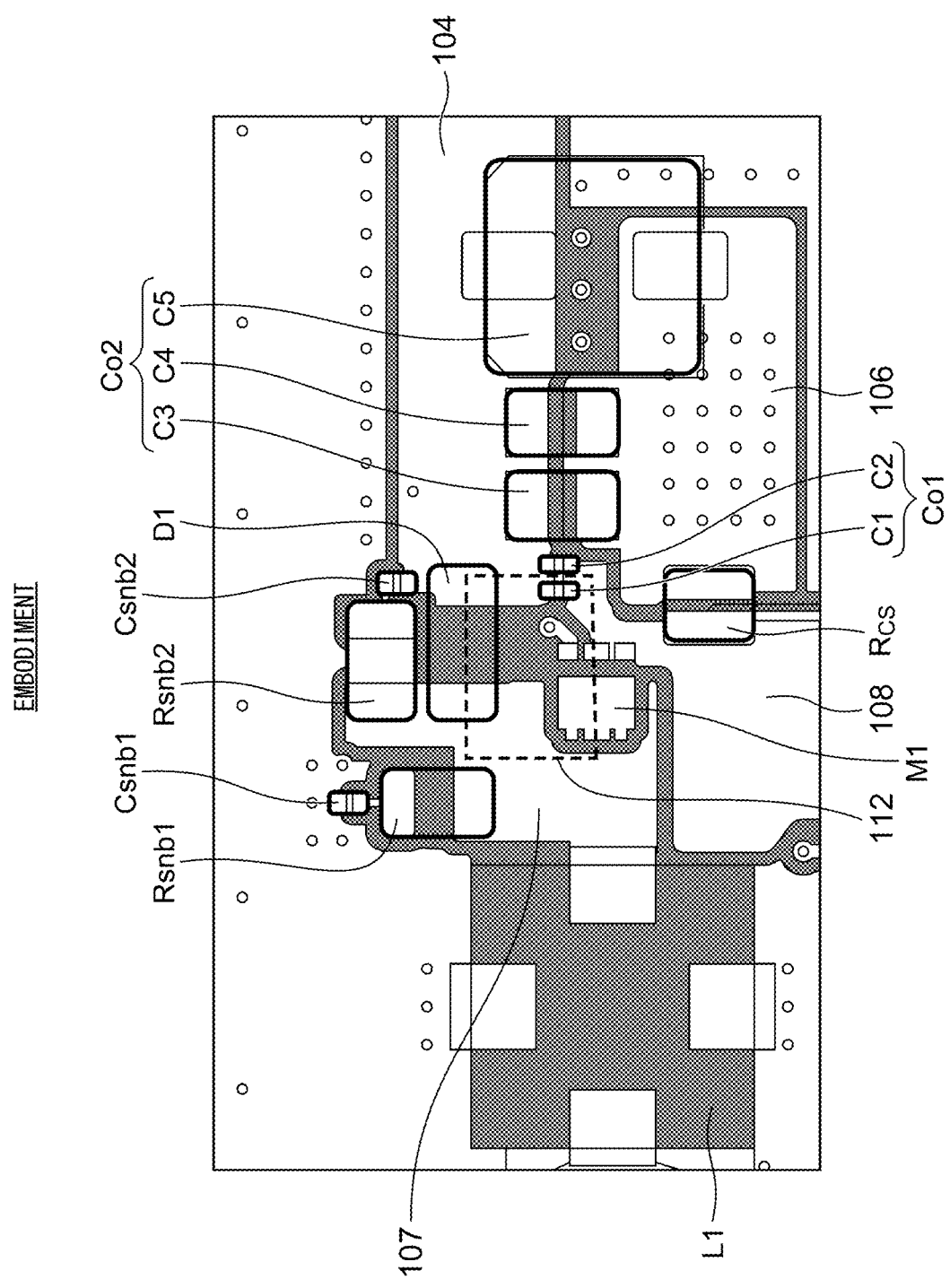
FIG. 9 is a diagram showing the layout of a printed circuit board of the boost converter shown in FIG. 7.

FIG. 9 is a diagram showing a layout of a printed circuit board of the boost converter 100 shown in FIG. 7. In this layout, an AC current loop 112 is formed including the wiring 107, the switching transistor M1, the rectifier diode D1, the output line 104, the first output capacitor Co1, and the wiring 108. The AC current loop 112 has a length and an area that are smaller than those of the AC current loop 110 shown in FIG. 7. Accordingly, with the boost converter 100 according to the embodiment, this is capable of suppressing electromagnetic noise as compared with the boost converter 100R according to the comparison technique.

In the layout shown in FIG. 7, the simulated inductance of the AC current loop 110 was 2.778 nH at 100 MHz. In contrast, in the layout shown in FIG. 9, the simulated inductance of the second AC current loop 112 was 1.998 nH at 100 MHz. Therefore, it can be confirmed that this is capable of reducing the inductance by 28% as compared with the layout shown in FIG. 7.

Usage

Figure 10:
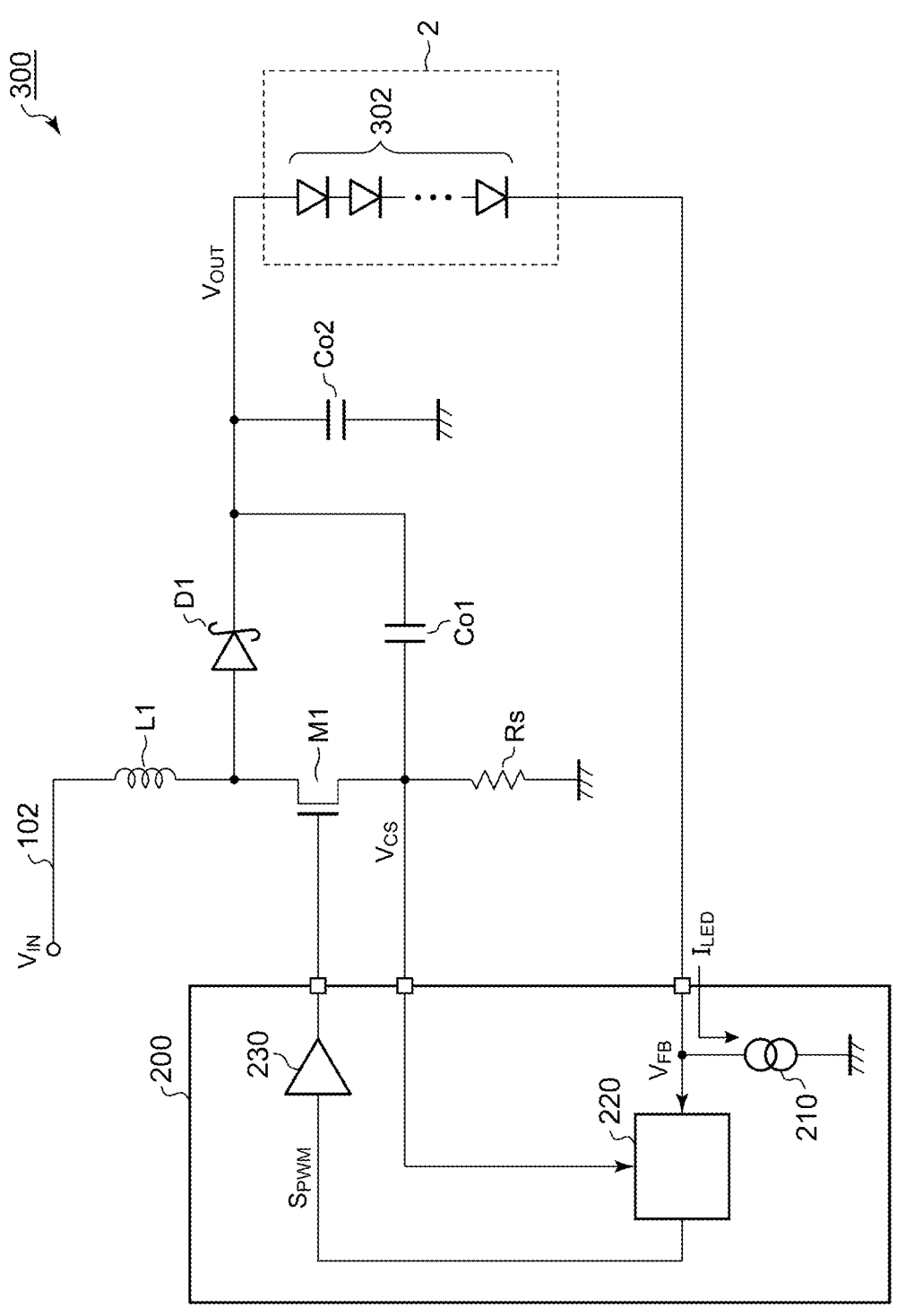
FIG. 10 is a circuit diagram of a light-emitting apparatus provided with the boost converter according to the embodiment.

FIG. 10 is a circuit diagram of a light-emitting apparatus 300 provided with the boost converter 100 according to the embodiment. In the light-emitting apparatus 300, the load circuit 2 is configured as an LED string including multiple light-emitting diodes coupled in series.

The LED string 302 is coupled to an LED pin of the converter controller 200. The boost converter 100 is configured as a constant-voltage-output boost converter in the same manner as shown in FIG. 1. However, the voltage stabilization target node is different. That is to say, in FIG. 1, one end of the load circuit 2, i.e., the voltage at the output line 104, is to be stabilized. However, in FIG. 10, the voltage at the other end of the load circuit 2 is to be stabilized.

The converter controller 200 includes a constant current source 210, a pulse width modulation (PWM) circuit 220, and a driver 230. The constant current source 210 is coupled in series with the LED string 302 via an LED pin. The constant current source 210 stabilizes the driving current $I_{LED}$ that flows through the LED string 302 to the amount of current according to the target luminance.

The PWM circuit 220 receives the voltage at the LED pin, i.e., the voltage across both ends of the constant current source 210 (voltage drop), as a feedback signal $V_{FB}$. The PWM circuit 220 feedback-controls the duty cycle of the pulse signal Spwm such that the feedback signal $V_{FB}$ approaches the target voltage. The driver 230 drives the switching transistor M1 according to the pulse signal Spwm.

The current detection signal Vs is used to control the current mode. Also, the current detection signal Vs is used for overcurrent protection.

Modifications

The above-described embodiments have been described for exemplary purposes only. Rather, it can be readily conceived by those skilled in this art that various modifications may be made by making various combinations of the aforementioned components or processes. Description will be made below regarding such modifications.

Modification 1

Description has been made in the embodiment regarding the diode-rectifier boost converter 100. Also, the present disclosure is applicable to a synchronous rectification boost converter provided with a synchronous rectification transistor (high-side transistor) instead of the rectifier diode D1.

Embodiment 2

Description has been made in the embodiment regarding the constant-voltage-output boost converter. However, the present invention is not restricted to such an arrangement. Also, the present disclosure is applicable to a constant-current-output boost converter. In this case of such a constant-current-output boost converter, the second output capacitor Co2 may be omitted. Also, an LC filter may be inserted in order to remove ripples instead of the second output capacitor Co2.

The embodiments have been described for exemplary purposes only. Rather, various modifications may be made by making various combinations of the aforementioned components or processes, which are also encompassed in the technical scope of the present disclosure or the present invention.

Notes

The following techniques are disclosed in the present specification.

Item 1

A boost converter comprising:

an input line structured to receive an input voltage;

an output line to be coupled to a load;

an inductor having one end coupled to the input line;

a switching transistor and a shunt resistor coupled in series between the other end of the inductor and a ground line;

a rectifier element coupled between the other end of the inductor and the output line;

a converter controller structured to control the switching transistor according to at least a voltage drop across the shunt resistor; and a first output capacitor having one end coupled to the output line and the other end coupled to a connection node that couples the switching transistor and the shunt resistor.

Item 2

The boost converter according to item 1, further comprising a second output capacitor with one end coupled to the output line and the other end coupled to the ground line.

Item 3

The boost converter according to item 2, wherein the first output capacitor has a capacitance that is smaller than that of the second output capacitor.

Item 4

The boost converter according to item 2 or 3, wherein the first output capacitor has a capacitance that is smaller than 1/10 of that of the second output capacitor.

Item 5

The boost converter according to any one of items 1 through 4, wherein the switching transistor has a switching frequency of 100 kHz to 2 MHz, and wherein the first output capacitor has a capacitance of 100 pF to 0.1 μF.

Item 6

The boost converter according to item 2, wherein the switching transistor, the shunt resistor, the rectifier element, the first output capacitor, and the second output capacitor are mounted on a printed circuit board, and wherein a closed loop formed of the switching transistor, the rectifier element, and the first output capacitor on the printed circuit board has an area that is smaller than an area of a closed loop formed of the switching transistor, the rectifier element, the shunt resistor, and the second output capacitor.

Item 7

The boost converter according to any one of items 1 through 6, wherein the rectifier element is configured as a diode.

Item 8

The boost converter according to any one of items 1 through 6, wherein the rectifier element is configured as a synchronous rectification transistor.

Item 9

The boost converter according to any one of items 1 through 8, wherein the load comprises a plurality of light-emitting elements coupled in series.

What is claimed is:

1. A boost converter comprising:

an input line structured to receive an input voltage;

an output line to be coupled to a load;

an inductor having one end coupled to the input line;

a switching transistor and a shunt resistor coupled in series between another end of the inductor and a ground line;

a rectifier element coupled between the another end of the inductor and the output line;

a converter controller structured to control the switching transistor according to at least a voltage drop across the shunt resistor;

a first output capacitor having one end coupled to the output line and another end coupled to a connection node that couples the switching transistor and the shunt resistor; and a second output capacitor having one end coupled to the output line and another end coupled to the ground line, wherein the switching transistor, the shunt resistor, the rectifier element, the first output capacitor, and the second output capacitor are mounted on a printed circuit board, and wherein a closed loop formed of the switching transistor, the rectifier element, and the first output capacitor on the printed circuit board has an area that is smaller than an area of a closed loop formed of the switching transistor, the rectifier element, the shunt resistor, and the second output capacitor.

2. The boost converter according to claim 1, wherein the first output capacitor has a capacitance that is smaller than that of the second output capacitor.

3. The boost converter according to claim 1, wherein the first output capacitor has a capacitance that is smaller than $\frac{1}{10}$ of that of the second output capacitor.

4. The boost converter according to claim 1, wherein the switching transistor has a switching frequency of 100 kHz to 2 MHz, and wherein the first output capacitor has a capacitance of 100 μF to 0.1 μF.

5. The boost converter according to claim 1, wherein the rectifier element is configured as a diode.

6. The boost converter according to claim 1, wherein the rectifier element is configured as a synchronous rectification transistor.

7. The boost converter according to claim 1, wherein the load comprises a plurality of light-emitting elements coupled in series.

* * * * *